US010960625B2

(12) United States Patent
Delorme et al.

(10) Patent No.: US 10,960,625 B2
(45) Date of Patent: Mar. 30, 2021

(54) DRUM FOR PRODUCING A TIRE, PROVIDED WITH MOBILE SECTORS

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Jean-Claude Delorme, Clermont-Ferrand (FR); Dominique Leblanc, Clermont-Ferrand (FR); Michel Druet, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 705 days.

(21) Appl. No.: 14/908,174

(22) PCT Filed: Jul. 23, 2014

(86) PCT No.: PCT/FR2014/051914
§ 371 (c)(1),
(2) Date: Jan. 28, 2016

(87) PCT Pub. No.: WO2015/015095
PCT Pub. Date: Feb. 5, 2015

(65) Prior Publication Data

US 2016/0167327 A1 Jun. 16, 2016

(30) Foreign Application Priority Data

Aug. 1, 2013 (FR) ...................................... 1357683

(51) Int. Cl.
*B29D 30/24* (2006.01)
*B29D 30/36* (2006.01)
(Continued)

(52) U.S. Cl.
CPC ........... *B29D 30/242* (2013.01); *B29D 30/24* (2013.01); *B29D 30/36* (2013.01); *B29D 30/244* (2013.01);
(Continued)

(58) Field of Classification Search
CPC ...... B29D 30/20; B29D 30/24; B29D 30/242; B29D 30/244; B29D 30/245;
(Continued)

(56) References Cited

U.S. PATENT DOCUMENTS 3,547,733 A 12/1970 Leblond
4,436,574 A 3/1984 Long
(Continued)

FOREIGN PATENT DOCUMENTS

CN 2521029 * 11/2002 ............. B29D 30/24
CN 2521029 Y 11/2002
(Continued)

OTHER PUBLICATIONS

Machine generated English language translation of JP 50-157477 (original document dated Dec. 1975) (Year: 1975).*
(Continued)

*Primary Examiner* — Robert C Dye
*Assistant Examiner* — Sedef E Paquette
(74) *Attorney, Agent, or Firm* — Dickinson Wright PLLC; Steven Hurles

(57) ABSTRACT

A drum for producing a tire casing blank comprises a support and sectors forming a circumferential face of the drum.

(Continued)

Each sector has a circumferential outer face having a contour of general trapezoidal form and is mounted so as to be movable relative to the support in a non-radial predetermined direction relative to an axis of rotation of the drum and intercepting this axis.

16 Claims, 14 Drawing Sheets

(51) Int. Cl.
*B29D 30/26* (2006.01)
*B29K 105/00* (2006.01)

(52) U.S. Cl.
CPC .......... *B29D 30/245* (2013.01); *B29D 30/246* (2013.01); *B29D 2030/2642* (2013.01); *B29D 2030/2657* (2013.01); *B29D 2030/2664* (2013.01); *B29K 2105/25* (2013.01)

(58) Field of Classification Search
CPC .................. B29D 30/246; B29D 30/36; B29D 2030/2642; B29D 2030/265; B29D 2030/2657; B29D 2030/2664; B29K 2105/25
USPC .............................. 156/110.1, 414, 415, 417
See application file for complete search history.

(56) References Cited

U.S. PATENT DOCUMENTS

| | | | | |
|---|---|---|---|---|
| 4,722,351 | A | 2/1988 | Phillipps et al. | |
| 6,058,999 | A | 5/2000 | Roberts | |
| 2003/0029573 | A1 * | 2/2003 | Franke | B29D 30/48 156/422 |
| 2003/0051817 | A1 | 3/2003 | Sawada | |
| 2004/0216831 | A1 | 11/2004 | Reding et al. | |
| 2012/0145329 | A1 * | 6/2012 | Stoila | B29D 30/0016 156/394.1 |
| 2012/0318460 | A1 | 12/2012 | Popp | |
| 2013/0214444 | A1 * | 8/2013 | Marchini | B29D 30/24 264/39 |
| 2015/0174841 | A1 * | 6/2015 | Nishida | B29D 30/48 242/430 |

FOREIGN PATENT DOCUMENTS

| | | | | |
|---|---|---|---|---|
| FR | 2981293 | * | 4/2013 | B29D 30/24 |
| JP | 50-157477 | * | 12/1975 | B29D 30/36 |
| KR | 10-2010-0021827 | * | 2/2010 | B29D 30/24 |
| WO | 2013/054051 | | 4/2013 | |
| WO | 2013054051 A1 | | 4/2013 | |
| WO | WO 2013/190696 | * | 12/2013 | B29D 30/48 |

OTHER PUBLICATIONS

Machine generated English language translation of FR 2981293 (original document dated Apr. 2013) (Year: 2013).*

Machine generated English language translation of KR 10-2010-0021827 (Year: 2010).*

Notification of First Office Action in CN 201480042606.X dated Sep. 26, 2016.

International Search Report for Priority Application PCT/FR2014/051914 dated Dec. 19, 2014.

* cited by examiner

DRUM FOR PRODUCING A TIRE, PROVIDED WITH MOBILE SECTORS

This application is a 371 national phase entry of PCT/FR2014/051914, filed Jul. 23, 2014, which claims benefit of French Patent Application No. 1357683, filed Aug. 1, 2013, the entire content of which is incorporated herein by reference for all purposes.

BACKGROUND

1. Field

The disclosure relates to tires and, in particular, the production of tire casing blanks.

2. Description of Related Art

Assembly of the elements forming the tread of a tire casing blank for a wheel takes place on a production drum, which is also called a crown form. These elements principally comprise unprocessed rubber. Once assembled, the tread is removed from the drum and deposited on a separately produced carcass. The association of the two forms a green tire. Forming of the latter results in the green blank that is subsequently cured to vulcanize the rubber.

Application WO 2013/054051 in the name of the applicants discloses a drum that comprises primary and secondary sectors forming its circumferential face. These sectors are movable in a radial direction relative to the axis of rotation of the drum in order to enable removal of the tread once it has been produced and also to adapt the diameter of the drum as a function of that of the tread to be produced. The primary sectors are likewise movable in the axial direction relative to the secondary sectors. Thus, when the diameter of the drum has to be increased, all the sectors are moved away from the axis and then the secondary sectors are brought closer to the primary sectors in the axial direction in order to fill in the spaces that have arisen between the primary sectors and to restore the continuity of the circumferential face in order that it can bear the elements of the tread.

The drum is produced such that the primary sectors carry the secondary sectors in the course of their radial movement. In order, subsequently, to allow movement of the latter relative to the former in the axial direction, the primary sectors have grooves of helicoidal form in which the secondary sectors slide. The lateral faces of the sectors designed to come into mutual contact also have a helicoidal form.

This drum thus offers the advantage of providing, for the production of the tread, a continuous bearing surface that is free from holes and reliefs, which preserves the properties of the rubber. Moreover, it is possible, as desired, to modify the diameter of the drum as a function of the tire model to be produced.

It is possible, however, to improve this drum. Indeed, the presence of helicoidal faces or grooves on each sector very substantially complicates their manufacture. Furthermore, the link between the primary and secondary sectors via these grooves requires the provision of a very substantial amount of energy when it is required to move the sectors relative to one another, particularly in order to modify the diameter of the drum.

SUMMARY

One object of an embodiment of the invention is to simplify the production of the drum and to reduce the energy to be provided in order to move the sectors relative to one another.

To that end, provision is made according to an embodiment of the invention for a drum for producing a tire casing blank, which comprises a support and sectors forming a circumferential face of the drum, each sector having a circumferential outer face having a contour of general trapezoidal form and being mounted so as to be movable relative to the support in a non-radial predetermined direction relative to an axis of rotation of the drum and intercepting this axis.

This method of movement of the sectors allows simplification of their geometric definition and a reduction in the energy to be provided for their relative movements, whilst achieving a practically continuous working surface. As regards the trapezoidal form, the word "trapezium" must be understood as referring to any quadrilateral that has two parallel sides of different lengths.

Provision may be made for each sector to be mounted so as to be movable in translation, particularly in rectilinear sliding, relative to the support in the predetermined direction.

Advantageously, each sector is mounted so as to be movable relative to the support by means of a ramp extending in the predetermined direction.

In one embodiment, each sector is connected to the support by an angle plate carrying the ramp.

Advantageously, the drum is arranged such that any one of the sectors cannot be moved relative to the support in the predetermined direction without the other sectors, also, moving relative to the support in the predetermined directions specific to them.

Provision may be made for the sectors to form two subassemblies arranged such that, when each of the sectors of one of the subassemblies moves in the predetermined direction relative to the support, it moves along the axis in a first direction and the sectors of the other subassembly move along the axis in a second direction, which is the opposite of the first direction.

Preferably, the drum is arranged such that the two subassemblies are the axially symmetric image of one another.

In one embodiment, the drum comprises at least one set of equipment mounted so as to slide relative to the support in the direction of the axis of rotation and connected to a plurality of the sectors.

Advantageously, the drum is arranged such that, when the sectors extend to the same distance from the axis of rotation, irrespective of what that distance might be, the circumferential outer faces of the sectors have edges each having a chord merged with the corresponding chord of the adjacent sector.

Thus, although these faces are not contiguous over their entire length, the fact that their chords are geometrically merged makes it possible considerably to limit the space between these faces and thus to maintain quasi-continuity between them. This arrangement is sufficient for the placement of the unprocessed rubber. It is a satisfactory compromise between the need to preserve the characteristics of the rubber and the flexibility of geometric design and drum manufacture.

Preferably, each sector has two principal planar lateral faces arranged in order to be placed opposite the homologous faces of the adjacent sectors.

The fact that these faces are planar facilitates their geometric definition and their manufacture.

Advantageously, the sectors may have an external nonstick surface treatment.

Thus, the rubber placed on the surface of the drum being hot, the treatment of this surface facilitates its subsequent removal.

In one embodiment, the plane of each lateral face is the image of a radial plane relative to the axis of rotation through a first rotation about a first axis perpendicular thereto, and through a second rotation about a second axis perpendicular to the first axis, the two rotations each taking place over an angle of less than 90°.

This definition of the orientation of the faces renders them compatible with the movements of the sectors and limits the generation of spaces in the confidential face.

For example, the angle of the second rotation is between 2 and 5°.

Such a choice makes it possible very substantially to limit breaks in the circumferential face.

Advantageously, certain sectors are capable of being placed so as to bear against the other sectors in the radial direction relative to the axis of rotation of the drum.

Thus, those sectors that bear other sectors to a great extent take up the radial stresses generated by the placement of the elements of the tread.

Preferably, each sector is mounted so as to be movable relative to the support in a radial direction relative to the axis of rotation of the drum.

Provision is thus made for the sectors to be movable not only in the inclined direction mentioned above but also in a direction perpendicular to the axis. Indeed, when it is required to move the tread produced from the drum, at least certain sectors are brought closer to the axis so as to form spaces between the drum and the tread. This is the operation of collapsing the drum. It is then possible to grasp the tread by inserting gripping means in the spaces or by using a peripheral transfer ring.

Provision may then be made to move all the sectors in the radial direction in such a manner as totally to release the tread from the drum. The mechanism for controlling the sectors known for this purpose comprises a first cam capable of moving certain sectors and a second cam capable of moving the others. An actuator makes it possible to turn one of the cams relative to the other and thus, at the start of the process, to bring the first sectors closer to the axis without moving the others. It is possible, however, to improve this arrangement. Indeed, this process requires, first, control of the actuator in order to turn one cam relative to the other, then control of another actuator to ensure the simultaneous movement of the two cams. Control of the drum in order to release the tread is thus relatively complicated. The mechanism, also, is likewise complex.

For this reason, advantageously, the drum according to an embodiment of the invention comprises at least one cam for controlling a radial movement of the sectors relative to the axis of rotation of the drum, the cam being arranged such that a monotonous movement of the cam gives rise, first, to the radial movement of certain of the sectors without modifying a radial position of the other sectors, and then gives rise to the radial movement of all the sectors simultaneously.

It will be recalled that a "monotonous function" is a function where the direction of variation does not change. Over a given interval, this is thus an increasing function or, alternatively, a decreasing function, but not both at the same time. "Monotonous movement" is thus understood to mean the movement of the cam does not change direction.

It is thus the same member and the same movement of the latter without a change in direction that ensures the two phases of the movement of the sectors. Control of the collapsing of the drum is thus simplified.

Provision is also made according to an embodiment of the invention of a method for producing a tire casing, wherein a portion at least of a tread of a green blank of the casing is assembled on a drum in accordance with the invention.

BRIEF DESCRIPTION OF THE DRAWINGS

A description will now be given of an embodiment of the invention by way of non-limiting example and with reference to the appended drawings, in which.

DETAILED DESCRIPTION OF SPECIFIC EMBODIMENTS

Figure 1:
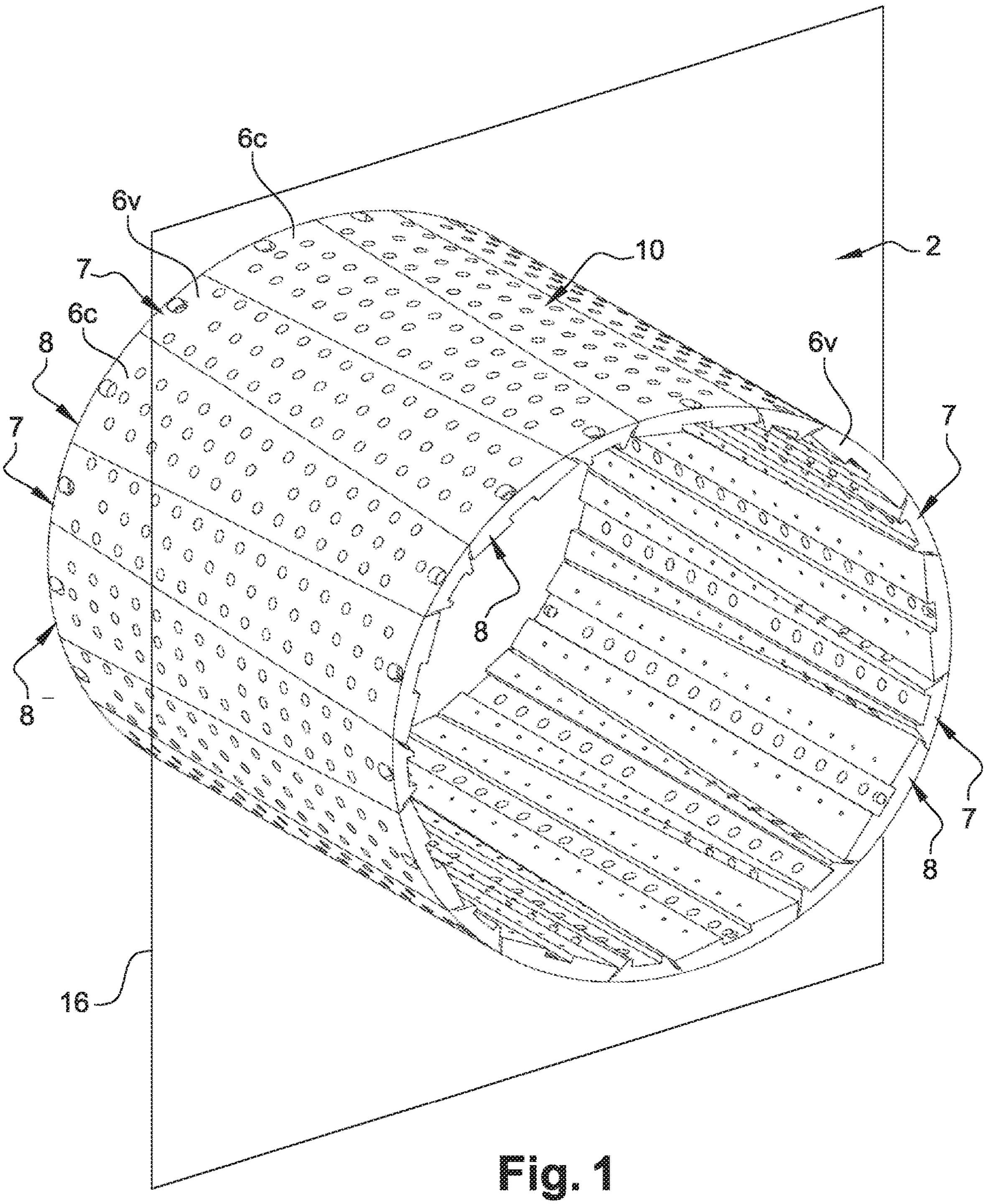
FIGS. 1 to 3 are perspective views illustrating three configurations of the sectors of the drum in one embodiment of the invention.

FIG. 1 illustrates a drum 2 according to one embodiment of the invention. This drum is used for the assembly of the elements that form a tread for a green blank for a tire. The tire is designed for a vehicle wheel, which may be a utility vehicle, a light vehicle, a passenger vehicle, a heavy goods vehicle or, alternatively, civil-engineering plant.

Figure 19:
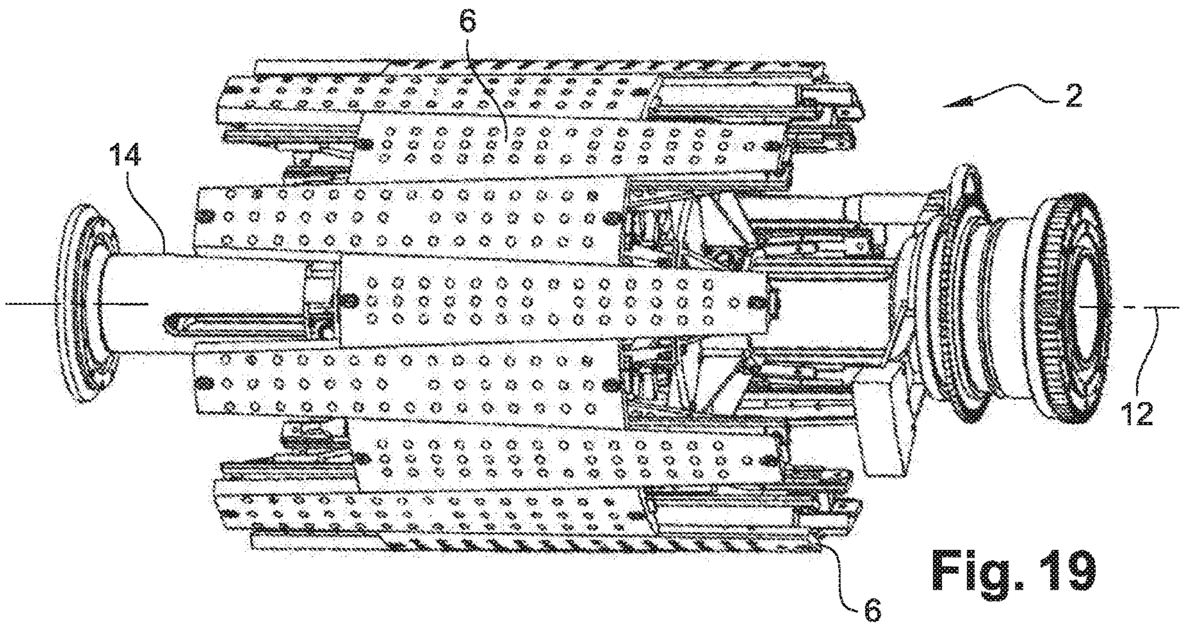
FIGS. 19 and 20 are respective perspective views of the drum and of the two types of sector.

The drum comprises a support 14 illustrated, in particular, in FIG. 19 and having a general form that is rotationally symmetrical about the axis 12, which forms the axis of rotation of the drum. In the text below, and unless indicated otherwise, the axial direction denotes a direction parallel to the axis 12 and the radial direction any direction that is radial relative to the latter, i.e. perpendicular thereto and thus intercepting this axis.

In the case of tooling for assembling a crown for a blank, the surface of this tooling is practically continuous, of variable diameter and, in particular, allows the construction of a tread by means of the successive stacking of strips of unprocessed rubber deposited in the hot state. To that end, it has a non-stick surface treatment to allow the placement of the hot rubber and to facilitate the subsequent removal thereof. The circumferential face of the drum is, in particular, free of reliefs or recesses in the form of steps that are often found in prior art drums. This avoids the deformation of the rubber strips and manufacturing defects such as the blisters that appear during curing.

The drum 2 has sectors **6*c*, 6*v* that extend at the periphery of the support 14 in order to form the circumferential face 10 of the drum that constitutes the working face on which the elements of the tread are arranged. This face 10 has, in the present case, a general cylindrical form with a circular cross section in a plane perpendicular to the axis 12**. The drum thus in this case forms that which a person skilled in the art often calls a "flat form".

As will be seen in the following text, one of the features of this drum is that the sectors are mounted in order to move in a linear direction that is inclined relative to the axis 12 and intercepts this axis without being perpendicular thereto. In the course of this movement, each sector follows a rectilinear path relative to the axis, which makes it possible to simplify the definition and the machining of the faces of each sector, particularly their lateral faces in contact with one another, and also the guide mechanism for these sectors. In particular, as will be seen, the lateral faces are planar, which renders them easily machinable.

The sectors 6*c*, 6*v* are in this case 18 in number, but this number could vary. Each sector has a plane of symmetry in which the axis 12 is inscribed. It has a cylindrical outer face 10 having contours of general trapezoidal form. These contours are delimited by four planar faces, namely two end faces 7 and 8, the face 7 being shorter than the face 8 in the circumferential direction, and two lateral faces 9. The faces 7 and 8 are perpendicular to the axis 12.

In the present case, two types of sector are distinguished. The sectors 6*c* of the first type are called "key sectors" and the sectors 6*v* of the second type are called "vault sectors". These two types of sector thus form two respective subassemblies. All the sectors of the first type are identical to one another. The same is true of the sectors of the second type. Depending on the circumferential direction relative to the axis 12, the sectors of the first type are arranged alternately with those of the second type, but are arranged end-to-end relative thereto.

Figure 5:
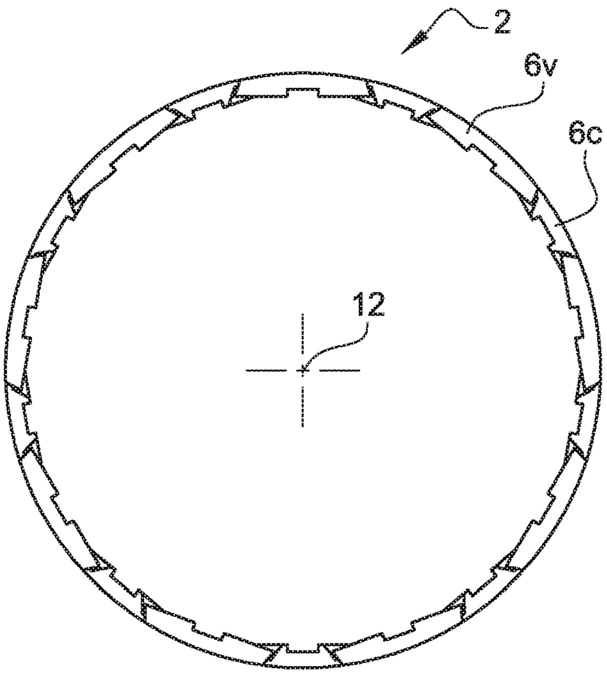
FIGS. 5 to 7 are sectional views of the sectors showing three configurations of the drum during the collapsing operation.

As illustrated in FIGS. 1 and 5, the drum is arranged such that the sectors are able to come into mutual contact in the circumferential direction via their lateral faces 9. Each sector thus comes into contact with the two adjacent sectors in the series. The key sectors and the vault sectors being alternated regularly, each key sector is contiguous to two vault sectors, and vice versa.

Moreover, the lateral faces 9 are inclined such that each key sector bears in the direction of the axis on the two neighboring vault sectors. In the course of construction of the tread, a radial stress exerted on this sector is thus transferred to the two neighboring vault sectors.

The sectors may be moved relative to one another in order to modify the diameter of the face 10. The configurations of the drum of smaller and larger diameter have been illustrated in FIGS. 2 and 3, respectively, FIG. 1 showing the configuration thereof of average diameter.

Figure 2:
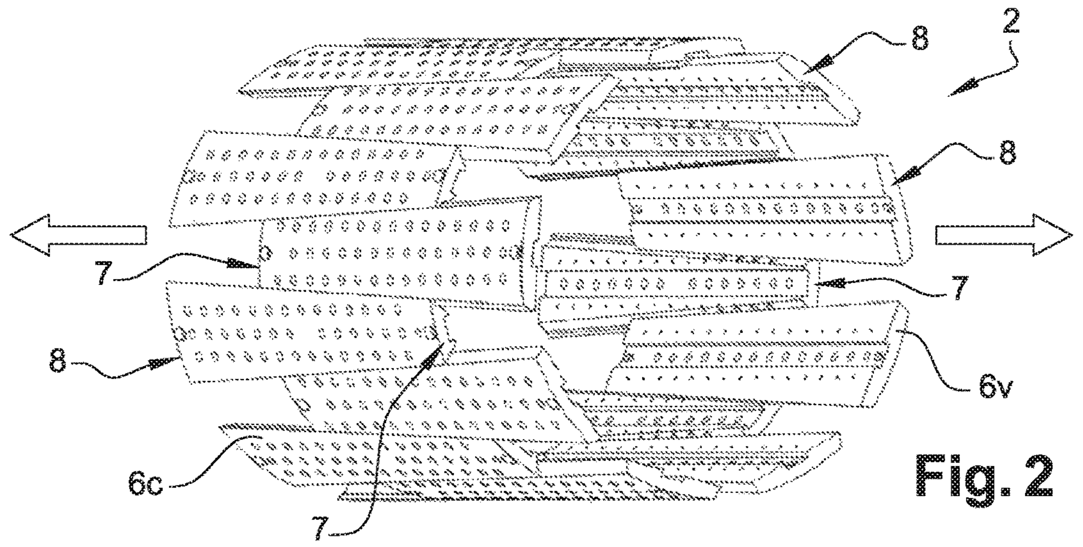

In FIG. 2, the distance between the small end faces 7 of the subassemblies is shorter than the distance between their large end faces 8. Thus, the sectors of each subassembly extend beyond those of the other subassembly in the axial direction via their large ends 8. The continuous circumferential surface offered for the production of the tread is delimited by the small faces 7.

Figure 3:
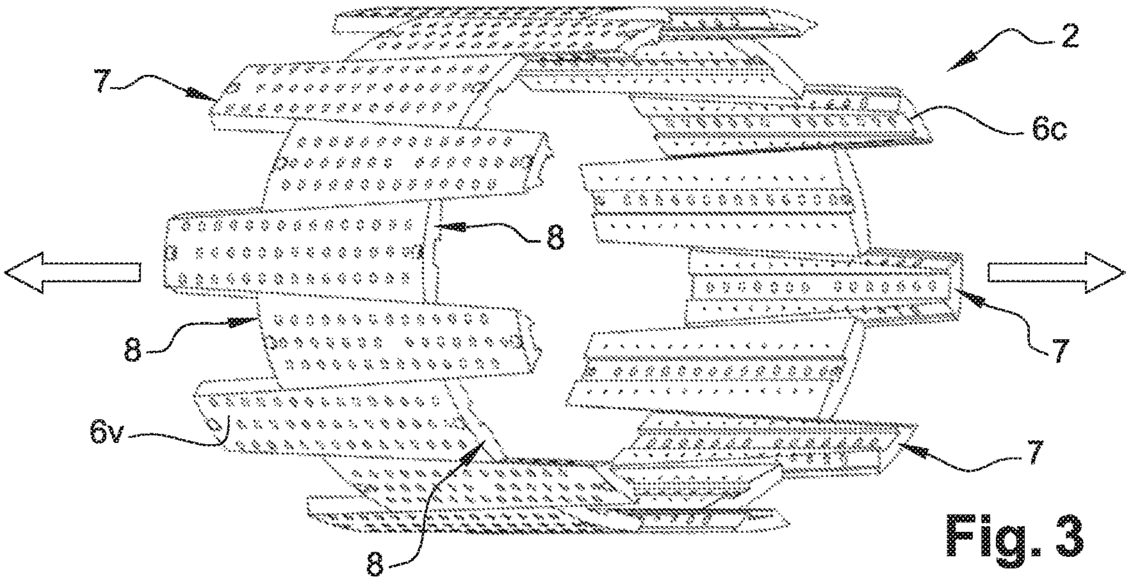

In the configuration of FIG. 3, the situation is precisely the reverse.

In the configuration in FIG. 1, the small ends 7 of the sectors of any one of the subassemblies extend in the same plane as the large end faces 8 of the sectors of the other subassembly. Thus, this time, it is the entire outer face 10 of the sectors that forms the working face of the drum. In this configuration, the drum is set to its average diameter and the outer face 10 is perfectly cylindrical.

The orientation of each lateral face 9 is chosen judiciously in order to:

- allow the radial movements essential to the expansion or the collapsing of the tooling;
- allow the movement of the sectors essential to adjustment of the diameter of the tooling;
- allow the preservation of the contact between the lateral faces 9, irrespective of the diameter chosen, in order to preserve as far as possible the continuity of the outer face thereof; and
- limit the radial height difference between the chord and the arc of the ellipse on the exterior edges of the sectors. As will be seen in the following text, these edges are the result of the intersection between the exterior cylindrical face of the sector and the planes of its lateral faces 9.

Two different mechanisms drive the movements of each sector relative to the support.

The first mechanism allows the adjustment of the diameter of the tooling by ensuring the dimensional coverage required. In the present case, this diameter may be modified over a range of 100 mm.

Figure 4:
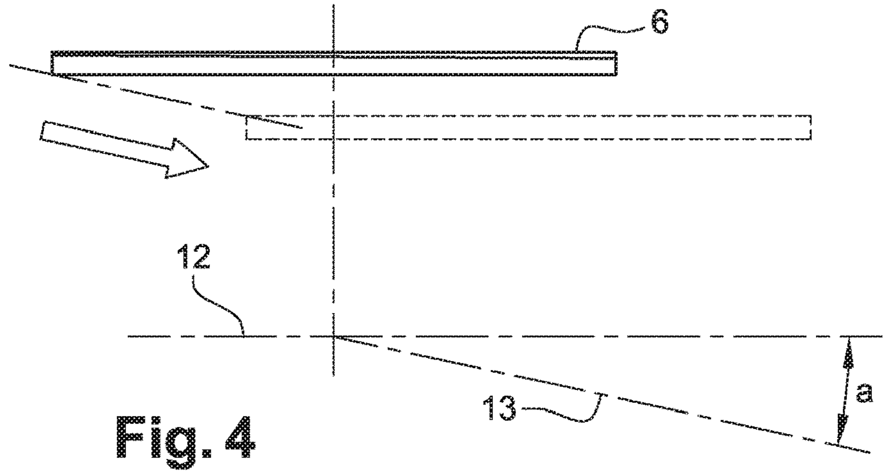
FIG. 4 is a diagram showing a sliding of each sector.

In the course of this adjustment, with reference to FIG. 4, on the basis of a configuration in which all the sectors extend by the same distance from the axis 12, each sector 6*c*, 6*v* slides relative to the support in a non-radial predetermined direction 13 relative to the axis 12 that intersects this axis. In the course of this movement, the sector thus remains parallel to the axis 12. The angle a formed by this direction and the axis is in this case the same for all the sectors.

Furthermore, this mechanism is arranged such that any one of the sectors cannot be moved in this way relative to the support without the other sectors, also, moving relative to the support in the predetermined directions specific to them. More precisely, when the sectors of any one of the subassemblies move in the direction 13 relative to the support, this movement has a component along the axis oriented in a first direction and the sectors of the other subassembly move with a component along the axis oriented in a second direction, which is the opposite of the first direction. The key sectors thus move in a first direction along the axis and the vault sectors in the opposite direction, their absolute speed being the same. At any instant in the movement, the sectors thus all remain at the same distance from the axis 12.

At any instant in the course of this movement, the two subassemblies are the axially symmetric image of one another. The axis of symmetry is perpendicular to the axis of rotation 12. FIG. 1 illustrates the median transverse plane 16 of the drum, perpendicular to the axis 12. At any instant in the course of the movement, the small end faces 7 of all the sectors extend at the same distance from this plane. The same is true of their large end faces 8.

The range of diameters to be covered and the width of the useful zone on the tooling may be modified by adjusting the geometry of the lateral faces 9 combined with the value of the angle of the direction 13 and by adjusting the length of the sectors combined with their travel relative to the median plane.

Figure 6:
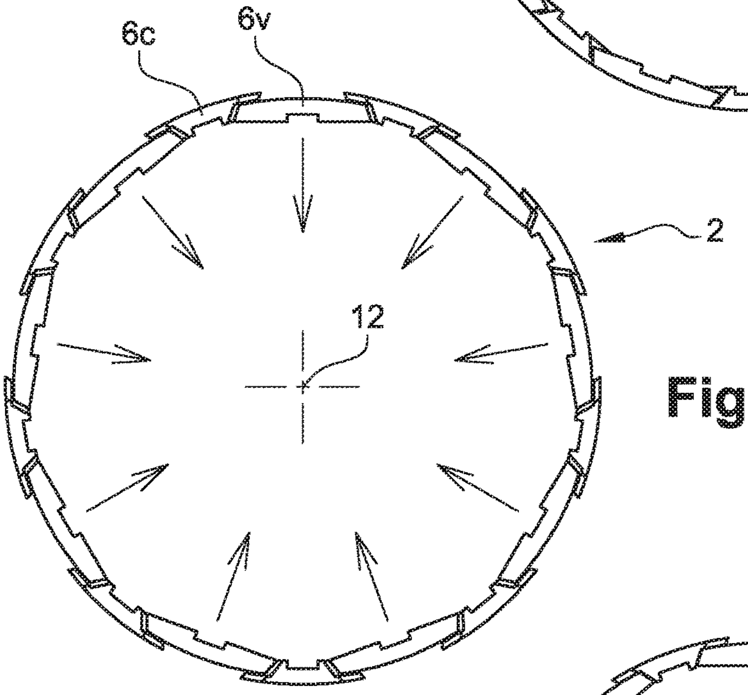
Figure 7:
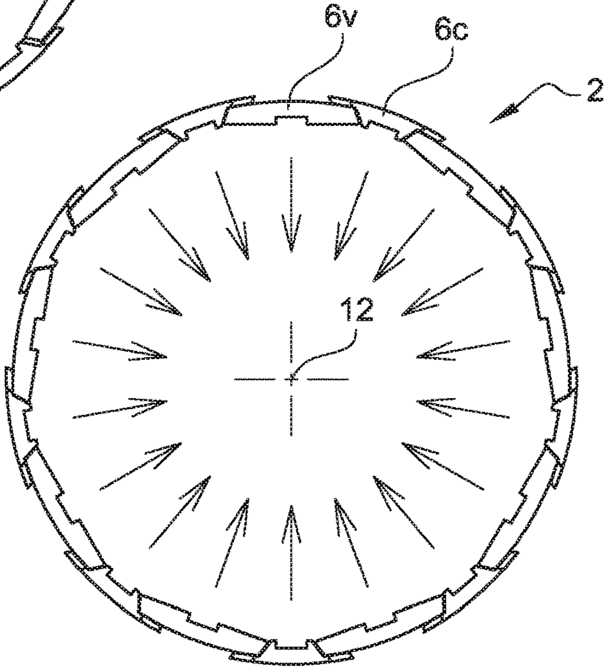

Furthermore, the second mechanism is produced such that each sector is mounted so as to be movable relative to the support in a radial direction relative to the axis 12. The sectors are thus movable between two positions. The first is a working position allowing the construction of the tread, the tooling having the diameter chosen for this work, as illustrated in FIG. 5. The second is a collapsed position of the tooling obtained after the radial movement of the sectors in the direction of the axis. This position allows the detachment of the sectors from the tread produced and the removal of the tooling from the interior thereof. More precisely, in the present case, this mechanism is arranged such that it gives rise, first, to the movement of the vault sectors 6*v* in the direction of the axis without modifying the radial position of the key sectors 6*c* as illustrated in FIG. 6, then gives rise to the radial displacement of all the sectors simultaneously, as illustrated in FIG. 7. In addition, the key sectors have lateral cut-outs on their lateral faces 9 allowing them to receive a portion of the adjacent vault sectors after the first phase of the movement. It is thus seen that it is advantageous to make provision for an even number of sectors. In particular, as the vault sectors descend first and alternate with the key sectors, the latter form support zones for the tread that are regularly distributed and preserve its dimensional uniformity while awaiting its transfer to another station and during this transfer.

Details of these two mechanisms will be given below. An explanation is first given of the geometric definition of the sectors.

Figure 8:
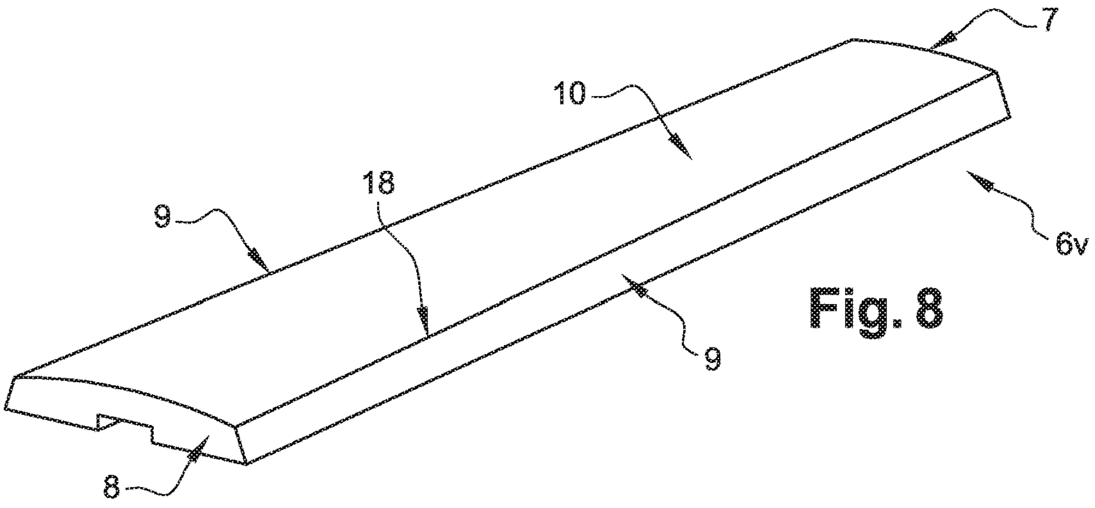
FIGS. 8 to 18 are views and diagrams illustrating the principle of the geometric construction of the lateral faces of the sectors.

As illustrated in FIG. 8, in the cylindrical circumferential outer face 10 of each sector, the diameter of the cylinder is chosen to correspond to the average diameter of the range of variation of diameter to be covered with the tooling, with a view to limiting the geometric differences between this average diameter and the minimum and maximum adjustment diameters of the drum.

Each lateral face 9 is inscribed in a plane that is inclined relative to the axis 12, the two faces 9 of the same sector forming a corner. Each edge 18 forming the intersection between the face 10 and one of the faces 9 is thus an arc of an ellipse. FIG. 8 shows a vault sector, but the key sectors are defined in a similar way. The sole difference lies in the orientation of the lateral faces 9, this being towards the interior of the drum in the case of the key sectors and towards the exterior in the case of the vault sectors.

Figure 9:
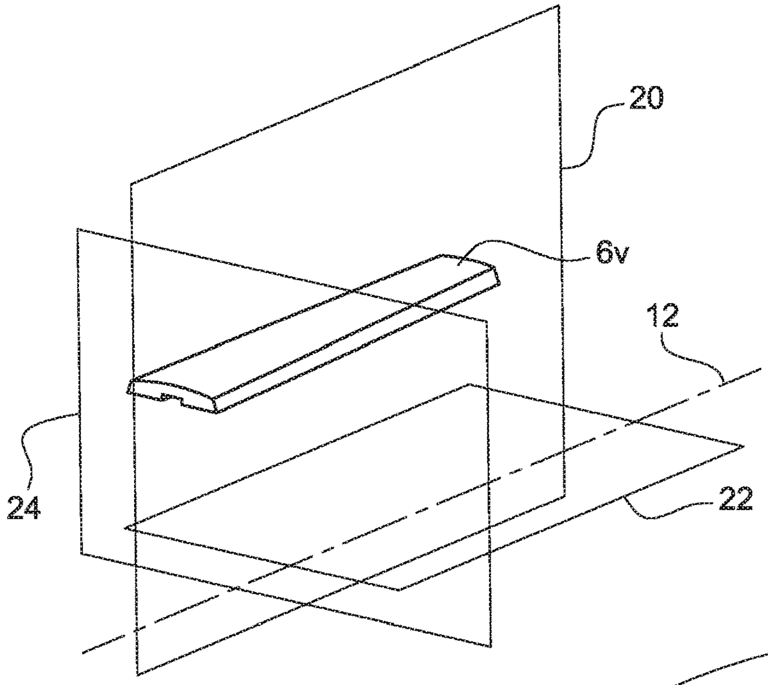

FIG. 9 illustrates the reference planes used to define the sector, i.e. the front plane 20 passing through the axis 12 and forming the plane of symmetry of the sector, the right plane 24, which is perpendicular to the axis 12, and the top plane 22, which is perpendicular to the preceding two planes.

The orientation of the plane of the face 9 is thus to be determined.

First, a point ρ of a generatrix of the cylinder of the face 10 is defined, this point passing through a radius R of a section of the cylinder and being referenced relative to the front plane 20 by an angle β about the axis 12, this angle being equal to (360/N)/2, where N is the number of sectors. This point is located mid-length along the generatrix on the sector, as may be seen in FIGS. 11 and 12. In the present case, the value of N is 18 and the value of β is 10°.

Figure 10:
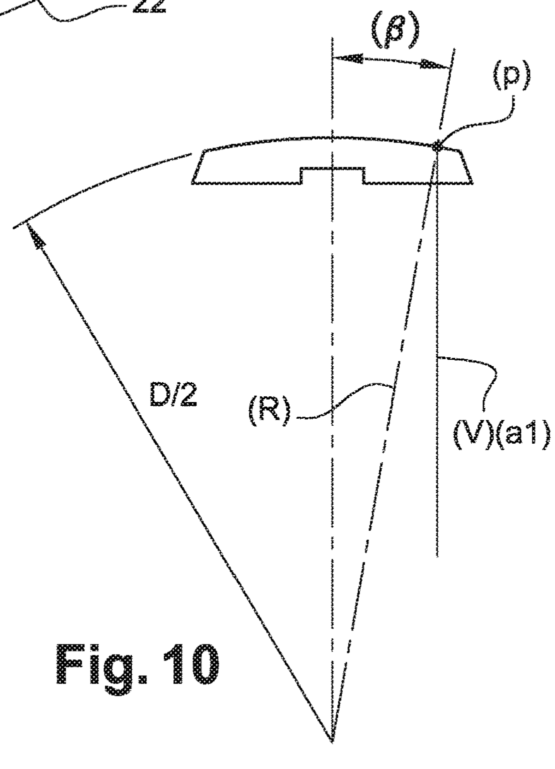
Figure 11:
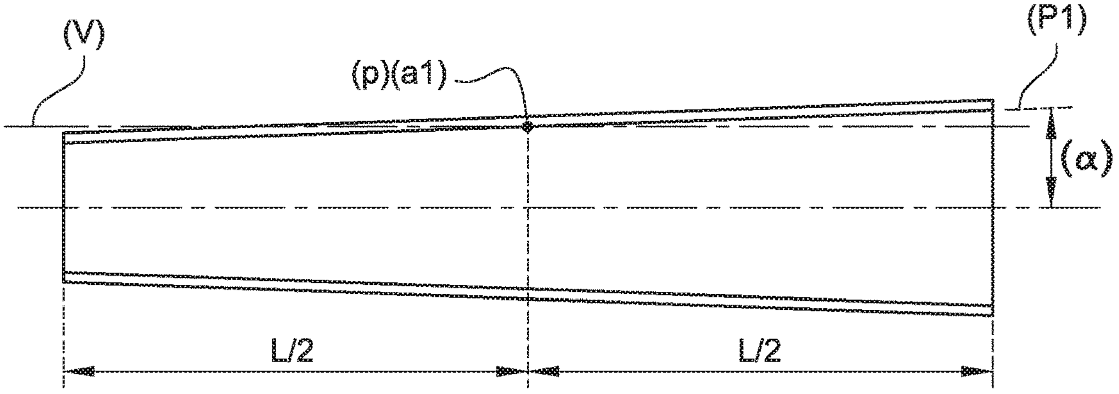

With reference to FIGS. 10 and 11, a plane V parallel to the front plane 20 and passing through the point ρ is then defined.

An axis a1 perpendicular to the axis 12, located in the plane V and passing through the point ρ is also defined.

A further plane P1 is defined as the image of the plane V through a rotation about the axis a1 in accordance with an angle α, as illustrated in FIG. 11.

Figure 12:
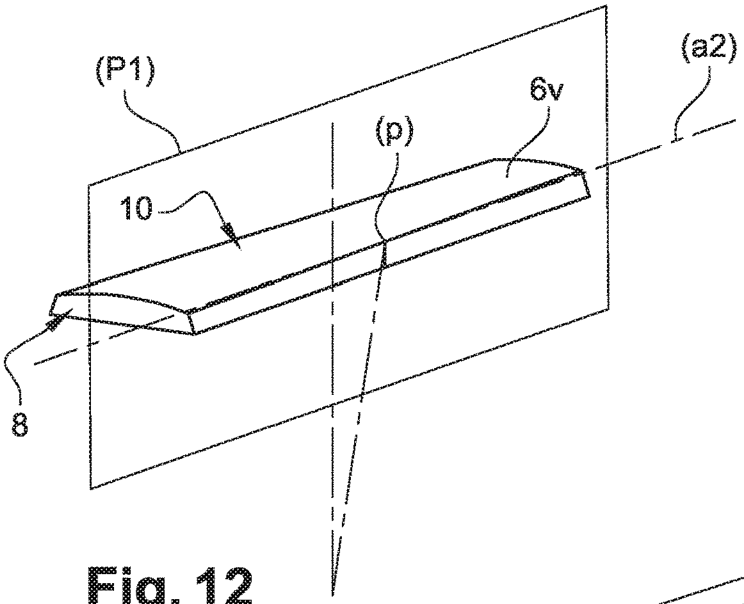

With reference to FIG. 12, an axis a2 parallel to the top plane 22 and passing through the point ρ is defined in the plane P1.

Figure 13:
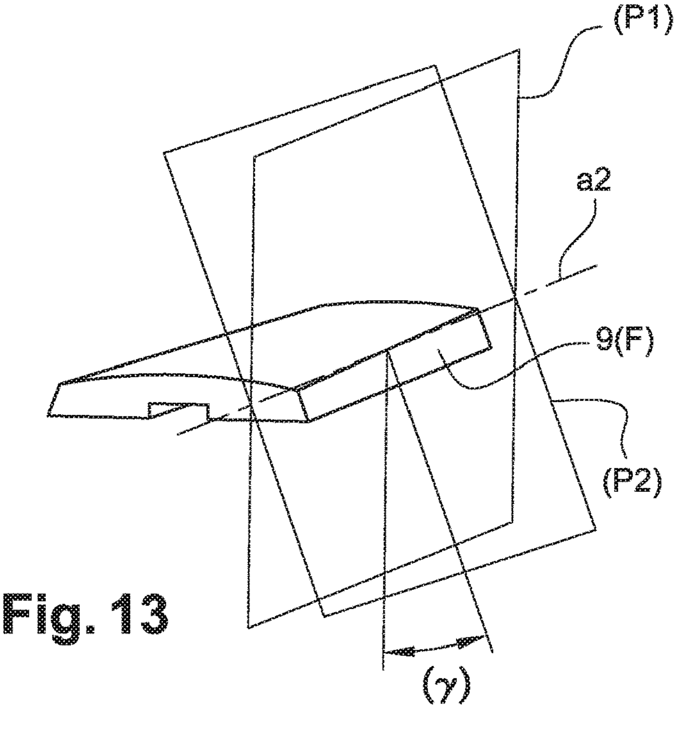

With reference to FIG. 13, a plane P2 is defined as the image of the plane P1 through a rotation about the axis a2 in accordance with an angle γ. The plane P2 is that of the lateral face 9.

The two rotations are effected about respective angles of less than 90°. In the present case, γ is chosen to be equal to 20°.

The plane of the lateral face 9 is thus the result of a translation of the radial plane forming the longitudinal plane of symmetry of the sector, then a rotation about the axis a1 and a further rotation about the axis a2.

This is the way, therefore, in which the faces 9 of the key sectors are defined. The faces of the vault sectors are defined using the same method in accordance with complementary angles such that, when the key and vault sectors are assembled on the drum and the latter is in the working position the faces 9 of the adjacent sectors are contiguous with one another.

Figure 14:
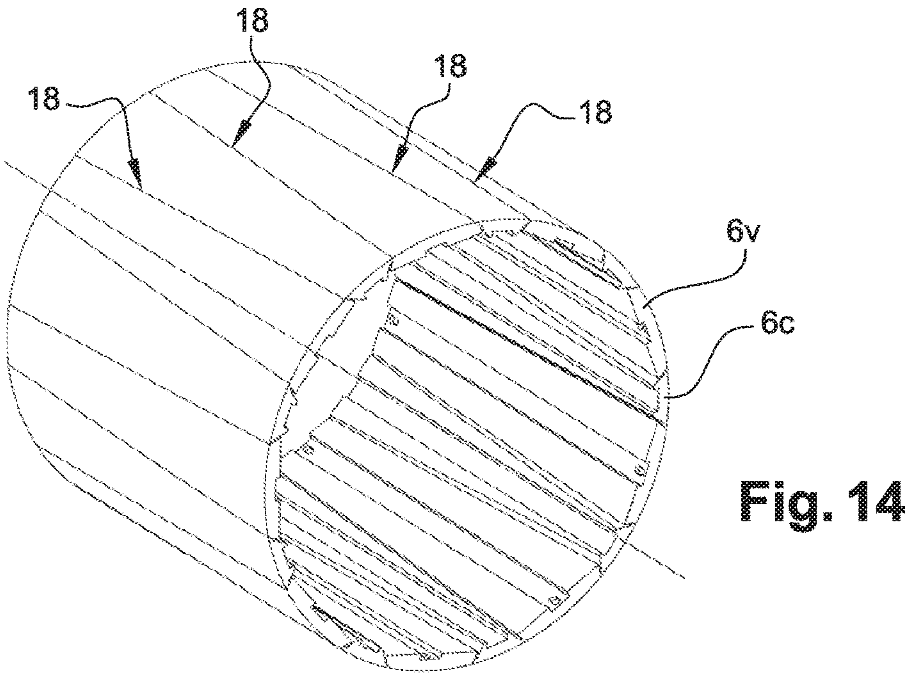

As illustrated in FIG. 14, when the sectors are positioned such that the external diameter of the drum is identical to the machining diameter of the face 10, i.e. identical to the average use diameter of the drum, everything is as if the exterior face of the drum were a cylinder cut into N sectors of which the lateral faces 9 defined according to the method described above had been machined with the aid of a zero-thickness saw blade. The edges 18 of the adjacent sectors are thus merged and the continuity of the surface of the cylinder is theoretically perfect. The machining tolerances of the various components and the clearances necessary for the functioning of the tooling introduce an alteration in this geometry of the order of some hundredths of a millimeter.

If, in this position of adjustment to the average diameter, the edges 18 of the adjacent sectors are perfectly merged, that is no longer the case when tooling is adjusted to a different diameter. Indeed, the arc of the ellipse of the edge of a sector is defined by the intersection of the fixed, average-diameter cylinder and the plane of the face 9, the position of which is geometrically fixed relative to the axis of the cylinder. When the drum is adjusted to a different diameter, the imaginary arc of the ellipse resulting from the intersection of the new cylinder of the drum and the new position of the face 9 would have a profile different than that of the edge 18. In this new position, the edges 18, the profile of which is fixed by construction, cannot thus any longer be merged with the face of the cylinder of a new diameter. The continuity of surface from one sector to the next is thus altered, to a greater or lesser extent, in accordance with the value of adjustment of the external diameter of the tooling and the angle α chosen for the construction of the sectors.

An attempt is thus made to minimize the offset between the edges 18 of two adjacent sectors by adjusting the angle α, which will have to be chosen to be small for the small tooling diameters, with a view to achieving a shallow curve for the edge 18. The angle α may increase as a function of the diameter of the face 10. Typically, in this example, α=2° for a range of variation in diameter of 100 mm and of tooling diameters of between 500 and 700 mm.

It is then a matter of determining the angle a of the direction 13 of movement of the sectors relative to the axis.

Figure 15:
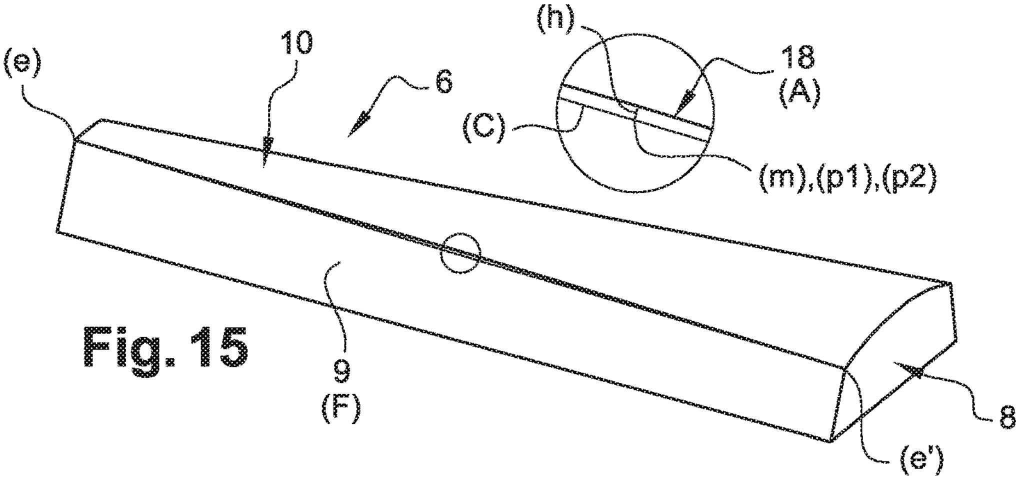

An attempt is made to maintain the edges 18 of adjacent sectors as close as possible without, however, being able to merge them. In the method used in this case, it is chosen to that end to maintain the chords C of the edges 18 merged, with reference to FIG. 15.

The alteration of the exterior surface of the tooling is the result of the offset in height between the two edges 18 of adjacent sectors. The maximum of this distance may be evaluated as the maximum height h between the arc 18 and its chord C in the plane of the face 9. Indeed, in the course of the movement of two adjacent sectors along the path of angle a, from the average diameter, any point p1 taken on the chord of one of the sectors, merged at the start with the point p2 taken on the chord of the other sector, in the plane of the mating face, rises radially and moves symmetrically with the median plane of the tooling of the same radial value as the point p2. "e" and "e'" denotes the ends of the chord of the edge 18. The chords C being maintained co-linear in the course of the movement, the maximum height difference between the edges 18 of the two sectors will thus be noted when the point e or the point e', depending on the direction of movement, will be merged with the middle m of the chord C of the neighbouring sector. The maximum height difference, in the plane of the face 9, will thus be equal to the height h.

Typically, in the present construction, this difference is at most of the order of 0.25 mm. Experience of manufacturing casings on similar tooling shows that an acceptable limit is of the order of 0.3 to 0.4 mm between two consecutive sectors. Such values are compatible with conventional strip rolling-down stresses (of the order of 1 daN/mm of roller width) and deposition speeds of up to 400 metres per minute, for example.

In order to determine the angle a, an attempt is made to define the radial elevation of a sector in the course of its movement in the direction 13, when the following conditions are met:

- the key and vault sectors move symmetrically relative to the median plane of the tooling, by the same radial value in the course of their movement, and remaining parallel to the axis 12;
- the faces 9 of the consecutive sectors are in contact at all working positions; and
- the chords C of two contiguous sectors remain co-linear.

Figure 16:
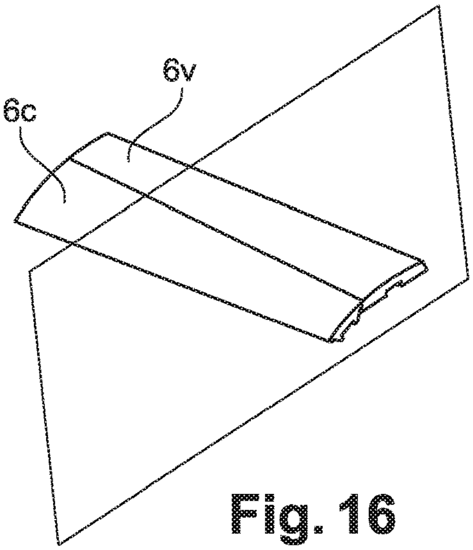
Figure 17:
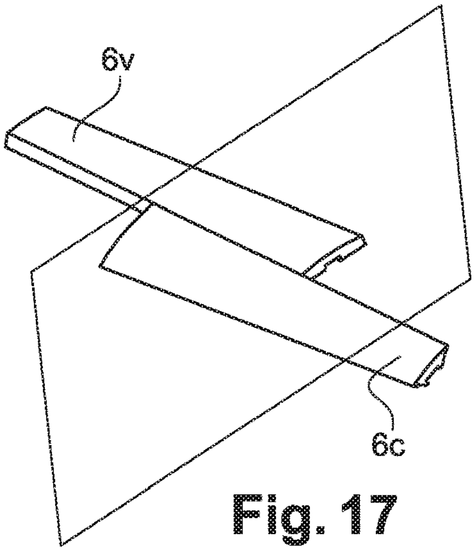

The expression of these conditions may be embodied in two particular positions illustrated in FIGS. 16 and 17, respectively:

- in the course of adjustment of the tooling to the machining diameter of the sectors (initial position), i.e. the average-diameter position; and
- in the position where the end e or e' of a sector is positioned in the middle of the chord of the neighbouring sector (final position), i.e. at the minimum or maximum diameter of the drum.

Figure 18:
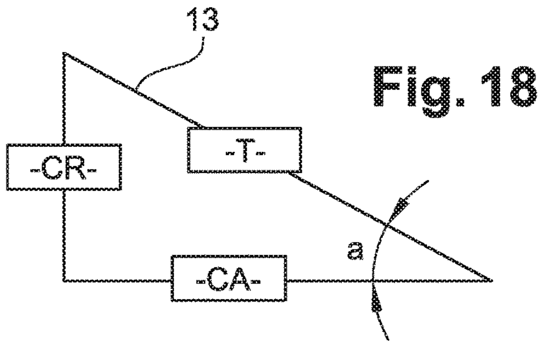

In these two positions, conventional trigonometric calculations allow definition of the Cartesian coordinates of particular points of sectors and, lastly, the radius of the tooling in the second position. It then suffices to solve the triangle illustrated in FIG. 18, which features the radial travel CR and the axial travel CA of the sector when following its inclined path of length T. In the present case, the axial travel is equal to one quarter of the length of the sector.

The angle a is thus obtained by: a=arctg (CR/CA).

For a given angle $\alpha$, the radial height difference between two sectors in the course of adjustment to the positions of minimum or maximum development is smaller, the larger the average diameter of the tooling, which corresponds to the machining diameter D of the sectors. Indeed, when the diameter D is increased, the height h reduces, because the arc of the ellipse of the edge 18 flattens.

This property may thus be used when designing tooling of greater diameter: in order to achieve a height difference between sectors that is substantially constant, irrespective of the diameter D, the angle $\alpha$ will be increased.

This method has a positive impact on the mass and the inertia of the tooling because:

- by increasing $\alpha$, a has to be increased;
- for a constant elevation, the axial travel is reduced;
- the length of the sectors necessary for the same range of useful width of tooling is reduced; and
- the sectors are thus lighter.

A detailed description will now be given of the mechanism of the drum, with reference to FIGS. 21 to 31.

The support 14 is formed in the present case by a shaft of axis 12 and of general cylindrical form. This shaft is fixed except when the drum is rotated when a tread is produced. The drum comprises angle plates 30 associated with the respective sectors. This angle plate is rigidly fixed to the corresponding sector and has a general right-angled triangle form, and the longer side of the angle plate contiguous to its right angle is that to which the sector is fixed. The hypotenuse of the angle plate forms a rail or ramp 32. It has an elongate rectilinear form, its orientation relative to the axis 12 corresponding to the aforesaid direction a of sliding of the sector. Just like the sectors, the angle plates associated with the key sectors are arranged end-to-end relative to those associated with the vault sectors.

In the vicinity of the right angle, each angle plate carries a roller 44 mounted so as to rotate freely relative to the angle plate about an axis perpendicular to the general radial plane of the angle plate. The rollers 44 associated with the key sectors extend globally in the same plane perpendicular to the axis 12. Those associated with the vault sectors likewise extend in one and the same plane, distinct from the other plane.

The drum also comprises sector carriers 34 having, at their crown, two slides 36 engaged on the rail 32 such that the angle plate is mounted so as to be movable by sliding over the sector carrier. The slides have a female profile that complements the male profile of the ramp.

The drum further comprises plates 38 rigidly fixed to the shaft 14 and extending in the radial direction from said shaft. Each sector carrier is mounted so as to be movable by radial sliding over the corresponding plate via adapted means that are not detailed.

Figure 24:
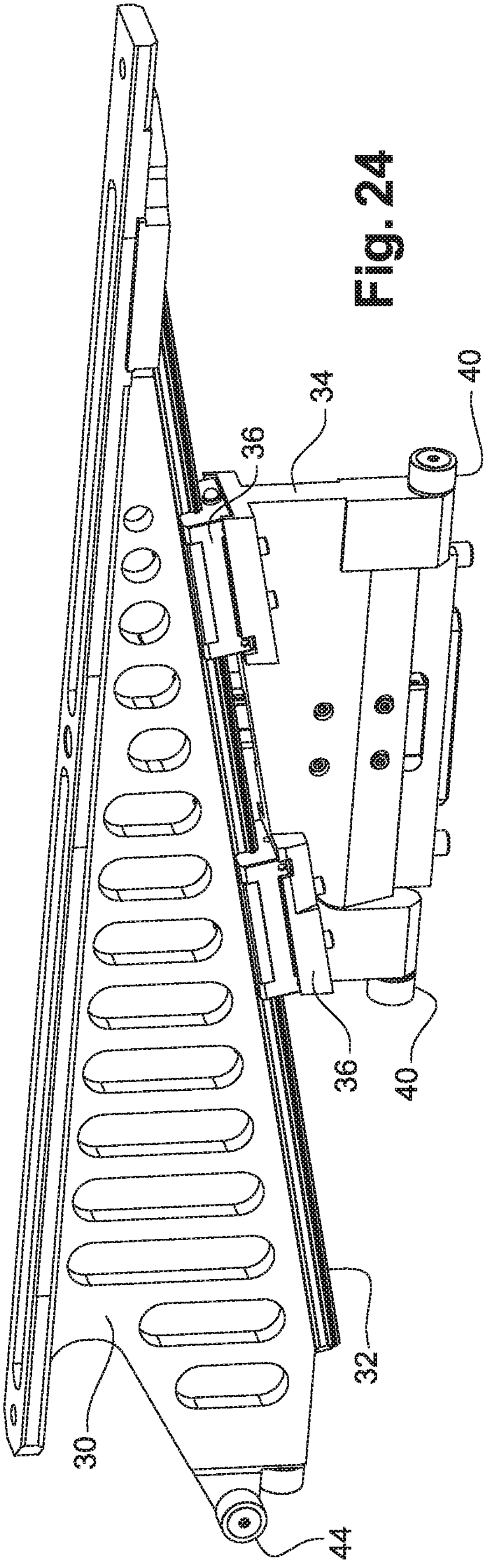
Figure 25:
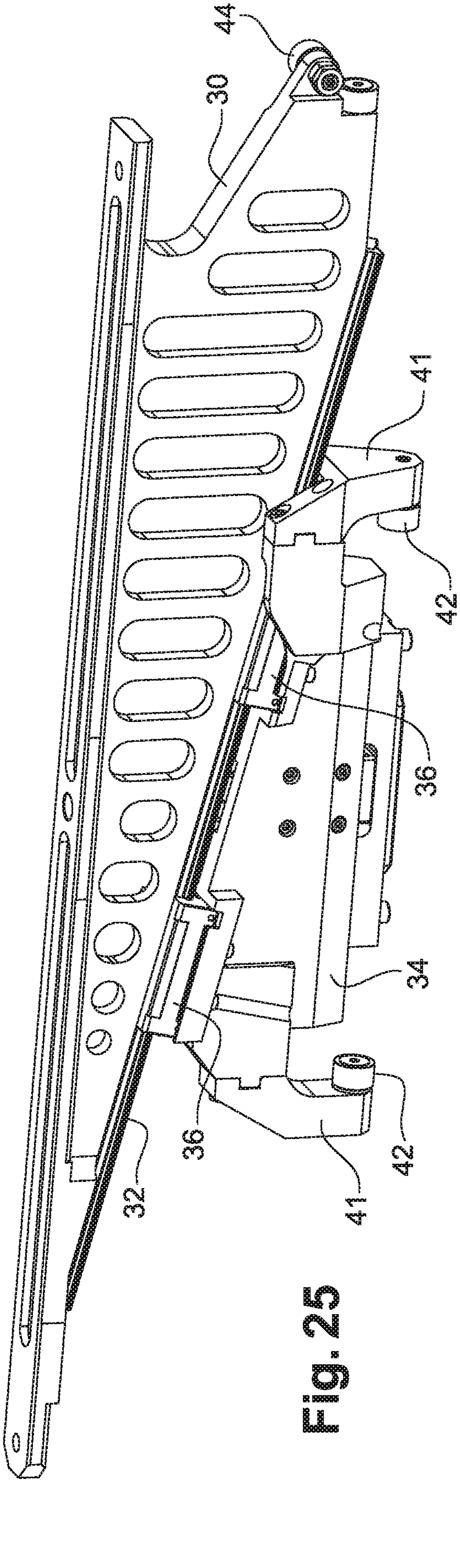

As illustrated in FIGS. 24 and 25, each sector carrier has two rollers or rolls 40, 42. The rollers 40 associated with the vault sectors are arranged at the ends of the sector carrier, whereas the rollers 42 associated with the key sectors are carried by arms 41 of the sector carrier and are opposite the body of the latter. All the rollers are mounted so as to rotate freely relative to the sector carrier about an axis parallel to the axis 12.

Figure 28:
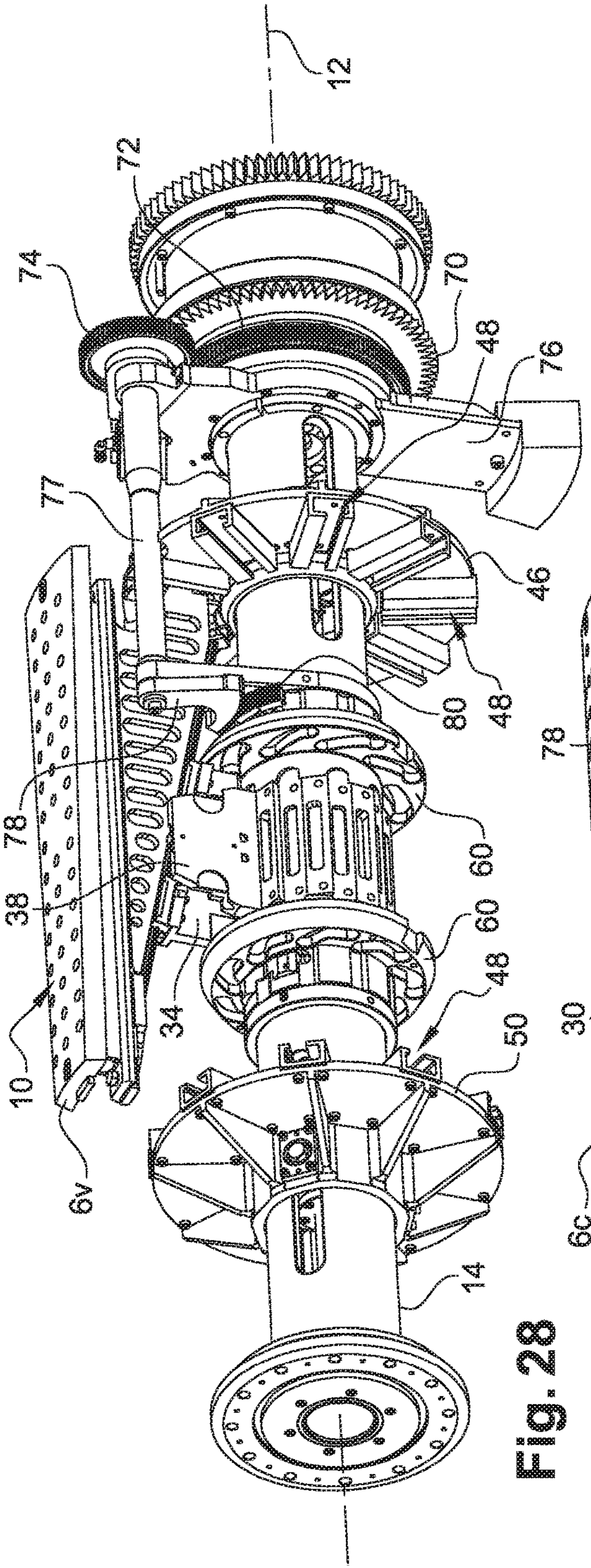
FIGS. 28 and 29 are perspective views of the central part of the drum with certain components removed.
Figure 29:
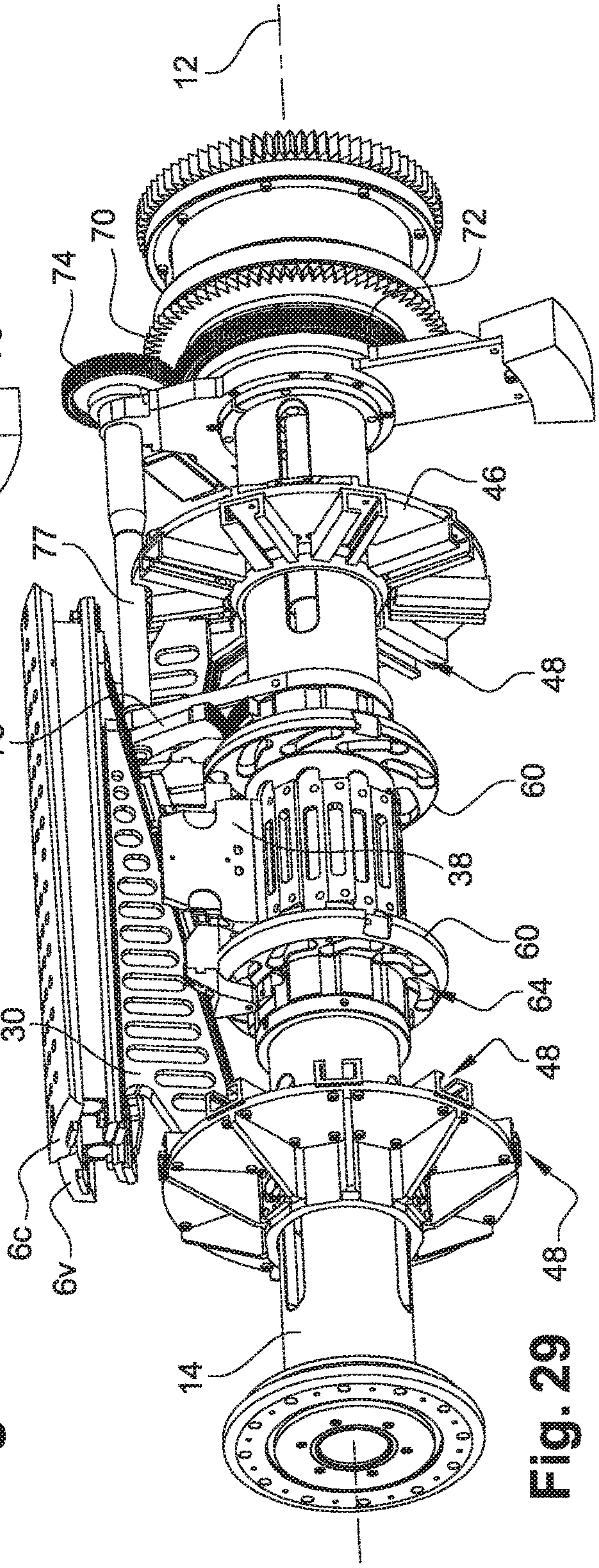

As illustrated in FIGS. 28 and 29, the drum comprises a dish 46 in the form of a disc of axis 12 mounted so as to be movable by sliding on the shaft 14 in the axial direction. It has profiled housings 48 that are open on the side of the angle plates of the vault sectors all along the housing and at the end of the latter, opposite the axis. The housings receive the corresponding rollers 44. The drum comprises a similar dish 50 associated with the rollers of the key sectors.

Figure 30:
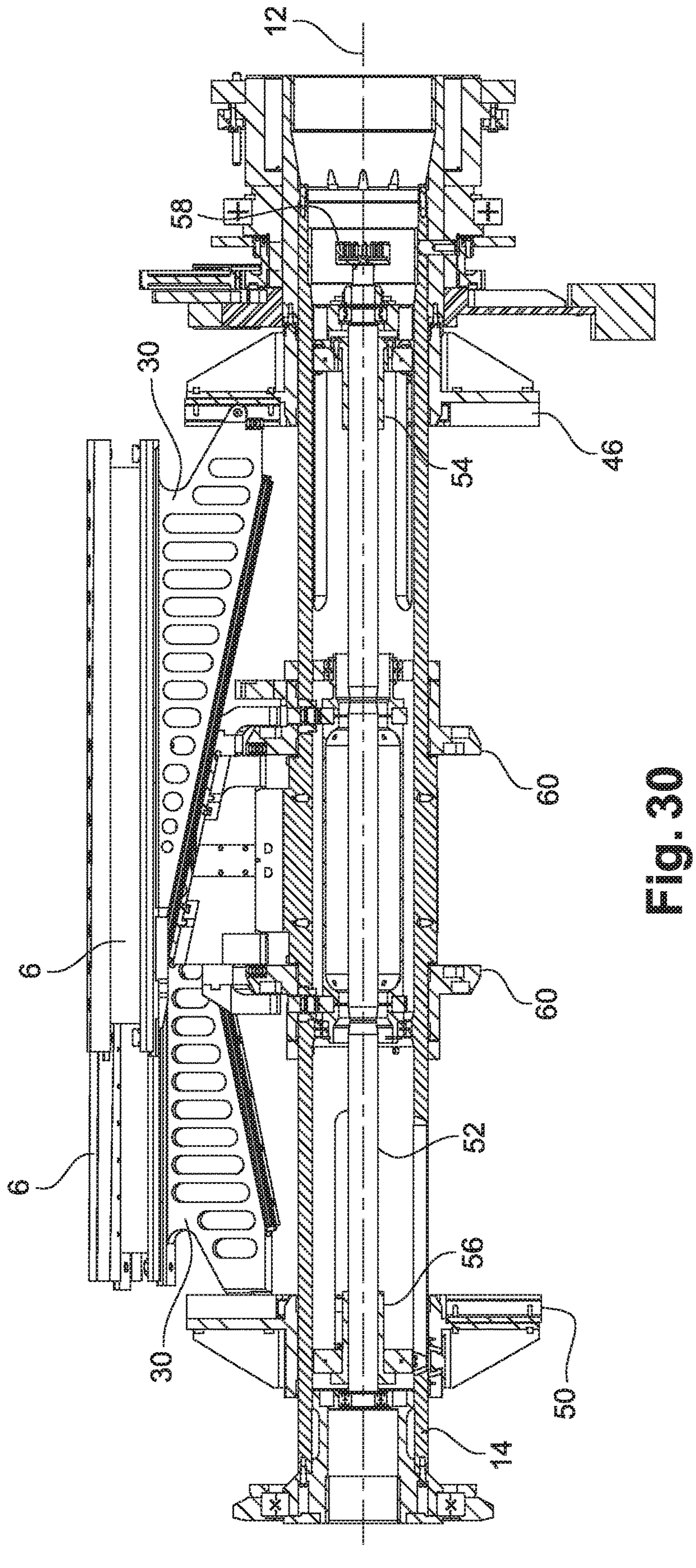
FIGS. 30 and 31 are sectional views of the central portion of the drum illustrating, respectively, its configurations of smaller and larger diameter.
Figure 31:
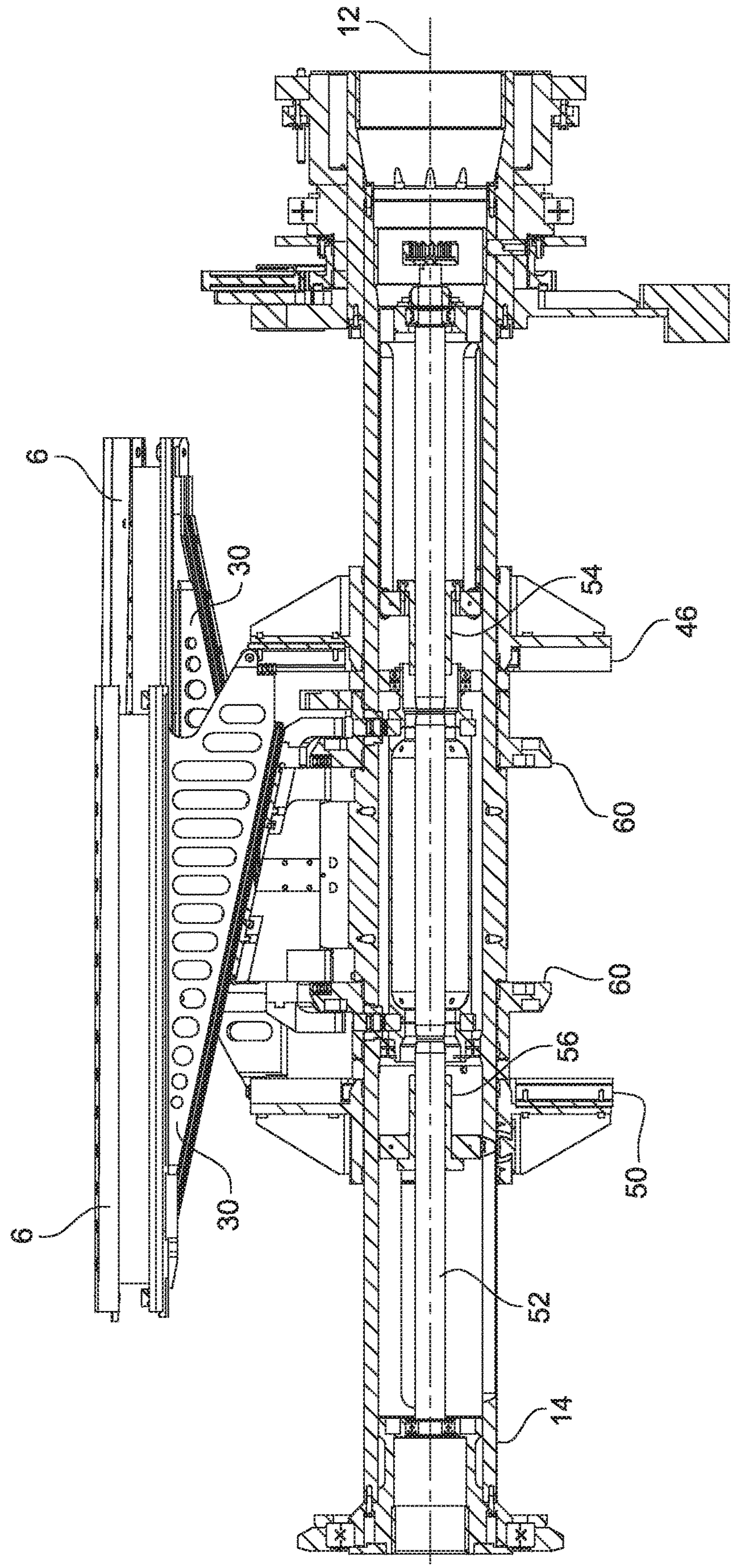

As illustrated, in particular, in FIGS. 30 and 31, the shaft 14 encloses a screw 52 that has two zones threaded in opposite directions. Two nuts 54 and 56 engage with these respective zones and are connected rigidly to the respective dishes 46, 50. The screw has at its end on the right in FIG. 30 a claw coupling 58 serving as means for coupling with a member for driving the screw in rotation but which is not illustrated.

Thus, rotation of the screw 52 from the claw coupling 58 gives rise to the sliding of the nut 54 and the dish 46 on the one hand and that of the nut 56 and the dish 50 in the opposite direction on the other. The equipment formed by the dish 46 and the nut 54 entrains, in its axial sliding, the angle plates 30 and the vault sectors 6*v*. Taking account of the ramp, this entrains the movement of the angle plates and of the sectors in the inclined direction relative to the axis. Similarly, the equipment formed by the dish 50 and the nut 56 entrains the angle plates 30 and the key sectors 6*c* and causes their movement in the inclined direction relative to the axis. Thus, in a first direction of rotation, the screw causes the key sectors and the vault sectors to move closer to one another in the axial direction and the diameter of the circumferential face of the drum to increase. This movement is shown by FIGS. 30 and 31 in succession. In the other direction of rotation, moving-apart of the dishes causes the reduction of this diameter. It is thus that the diameter of the working face of the drum is adjusted.

Figure 26:
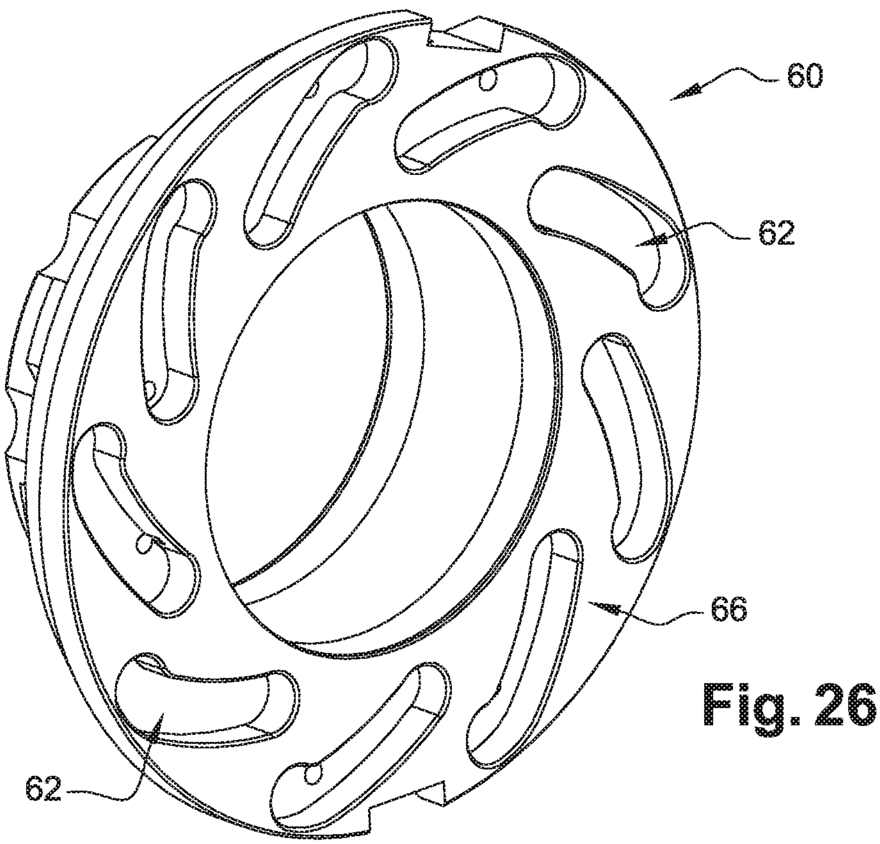
FIGS. 26 and 27 are perspective views of the two faces of one of the cams.
Figure 27:
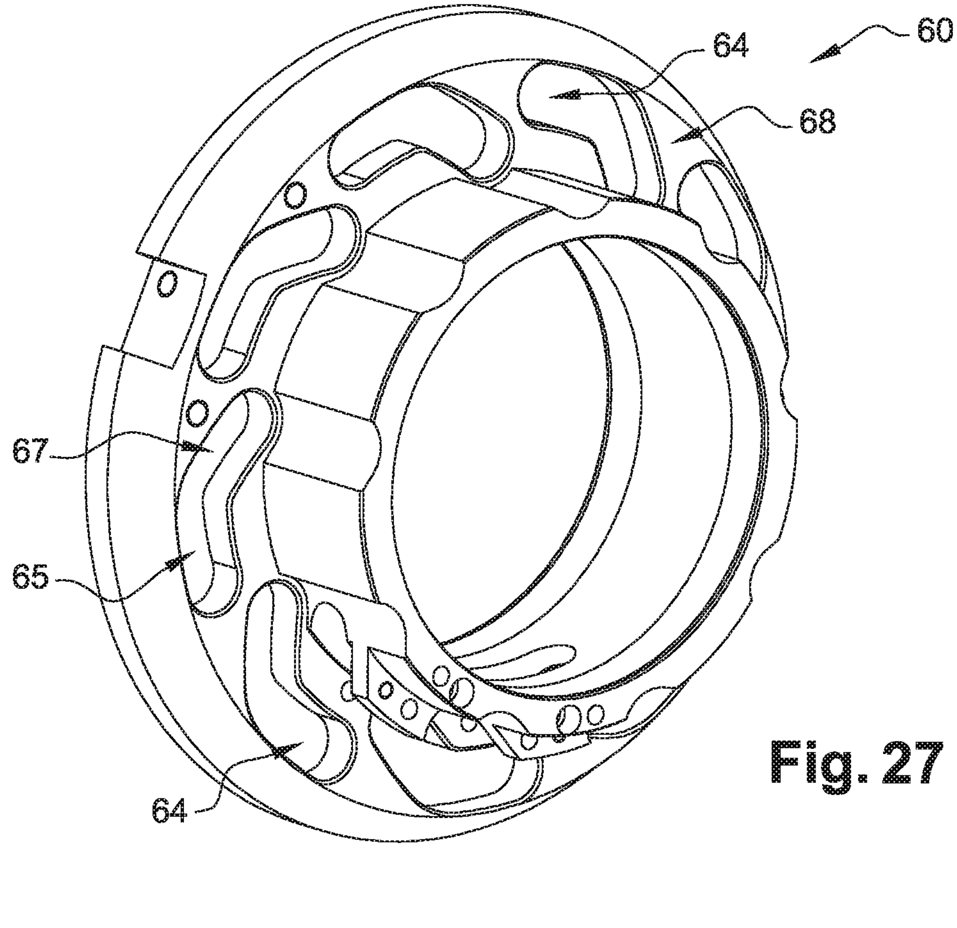

The drum further comprises two double-face cams 60. The two faces of the cam located furthest to the right in FIG. 28 are illustrated in FIGS. 26 and 27. The two cams are secured rigidly to one another and mounted so as to rotate freely on the shaft 14 about the axis 12, with no possibility of sliding along the latter. Each double-face cam comprises a disc having grooves or ramps 62, 64 on its respective faces 66, 68. The two cams are symmetric one to the other relative to a plane perpendicular to the axis 12, the faces 66 being oriented towards one another. The grooves 62 of these faces receive the respective rollers 40 associated with the vault sectors. The grooves 64 of the other faces 68 receive those corresponding to the key sectors 6*v*.

On the cam in FIGS. 26 and 27, the grooves 62 are identical to one another. The same is true of the grooves 64. Each groove 62 has a very short portion in the form of an arc of a circle of axis 12 contiguous with the edge of the disc and a principal portion in the form of an arc of a circle, the portion running towards the axis. Each groove 64 comprises two portions 65, 67 of substantially the same length, both in the form of an arc of a circle. The first 65 is located at the edge of the disc and is centred on the axis 12, whereas the second is closer to the axis 12.

The shaft carries a wheel 70 and a pinion 72 that are secured rigidly to one another and both mounted so as to be movable in rotation relative to the shaft about the axis 12. The drum also comprises a pinion 74 mounted so as to be movable in rotation about an axis parallel to the axis 12 but distinct therefrom and carried by an arm 76 that is itself carried by the shaft 14. An axle 77 is secured rigidly to the pinion 74 and a toothed sector 78 in engagement with another toothed sector 80 rigidly secured to the cams 60.

When a pinion outside the drum engages with the wheel 70 in order to make it rotate, this gives rise to the rotation of the pinion 72, of the wheel 74 and of the two toothed sectors with the cams 60. Taking account of the form of the grooves 62, the vault sectors 6*v* are entrained in the direction of the axis by sliding of the sector carrier on the plate. During this time, the rollers 42 associated with the key sectors run along the first outer portion 65 of the grooves 64. Taking account of the form of this portion, these sectors retain an unchanged radial position. The drum then passes from the configuration of FIG. 5 to that of FIG. 6.

In the course of the second phase of rotation of the cams in the same direction, the vault sectors continue to move closer to one another radially and at the same time the key sectors begin to move closer together because the corresponding rollers 42 now engage with the other portion 67 of the grooves 64. The key sectors and the vault sectors thus move simultaneously towards the axis. The drum thus arrives in the configuration of FIG. 7. This operation of collapsing the sectors is possible irrespective of the adjustment diameter of the drum except where this diameter is too small to allow the radial movement of the sectors.

Provision may also be made for each groove of the cams to be produced such that, for a constant speed of rotation of the cam, the speed of movement of the sectors is made variable, for example progressive or lower at the end of collapsing or extension travel, with a view to reducing jolting.

Figure 20:
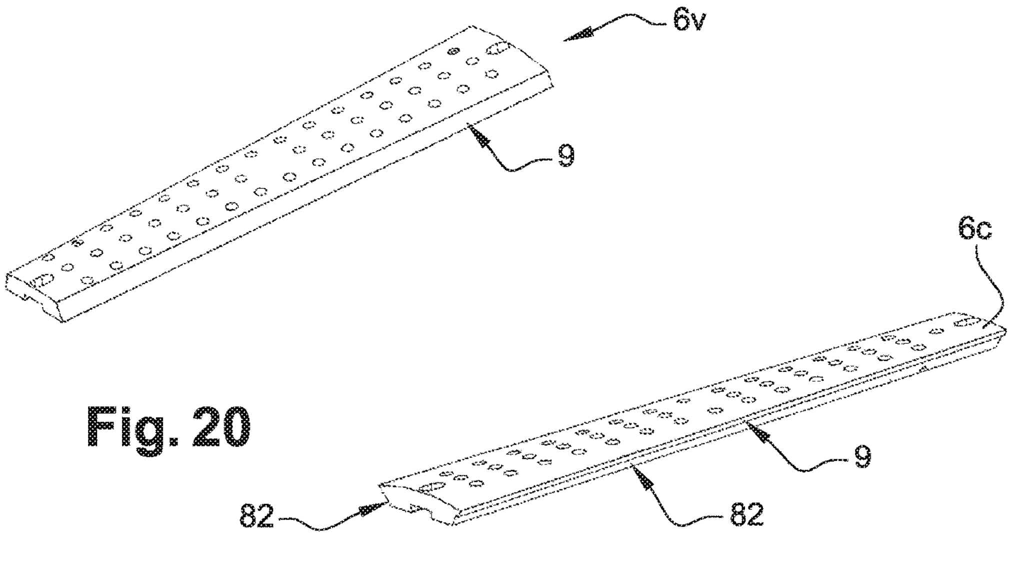
Figure 21:
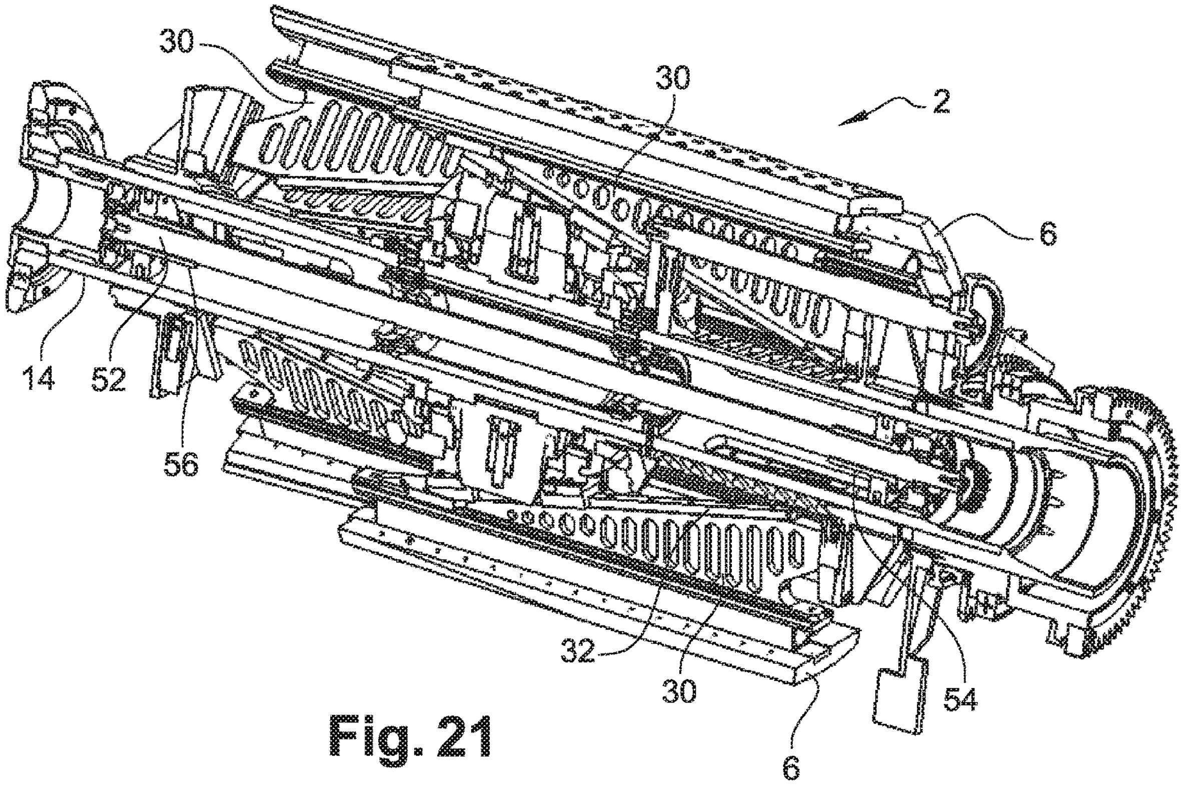
FIG. 21 is a perspective and sectional view of the drum of FIG. 19.
Figure 22:
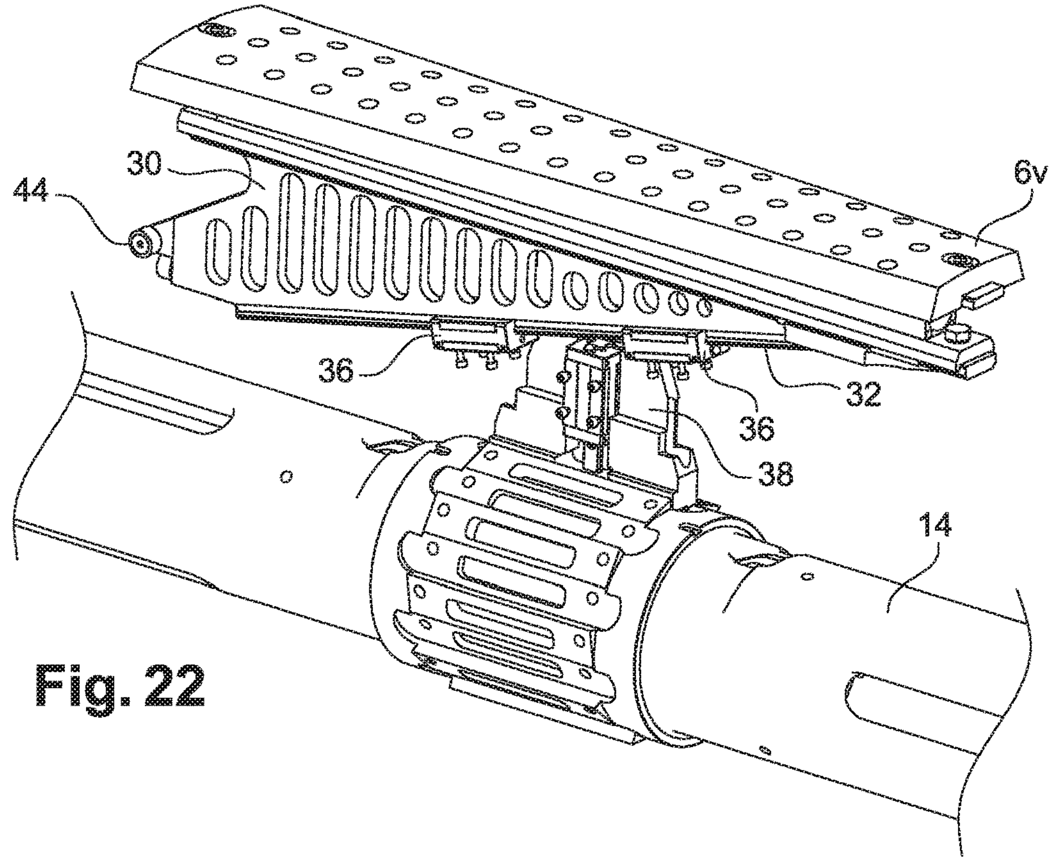
FIGS. 22 to 25 are perspective views illustrating the link of the sectors to the support.
Figure 23:
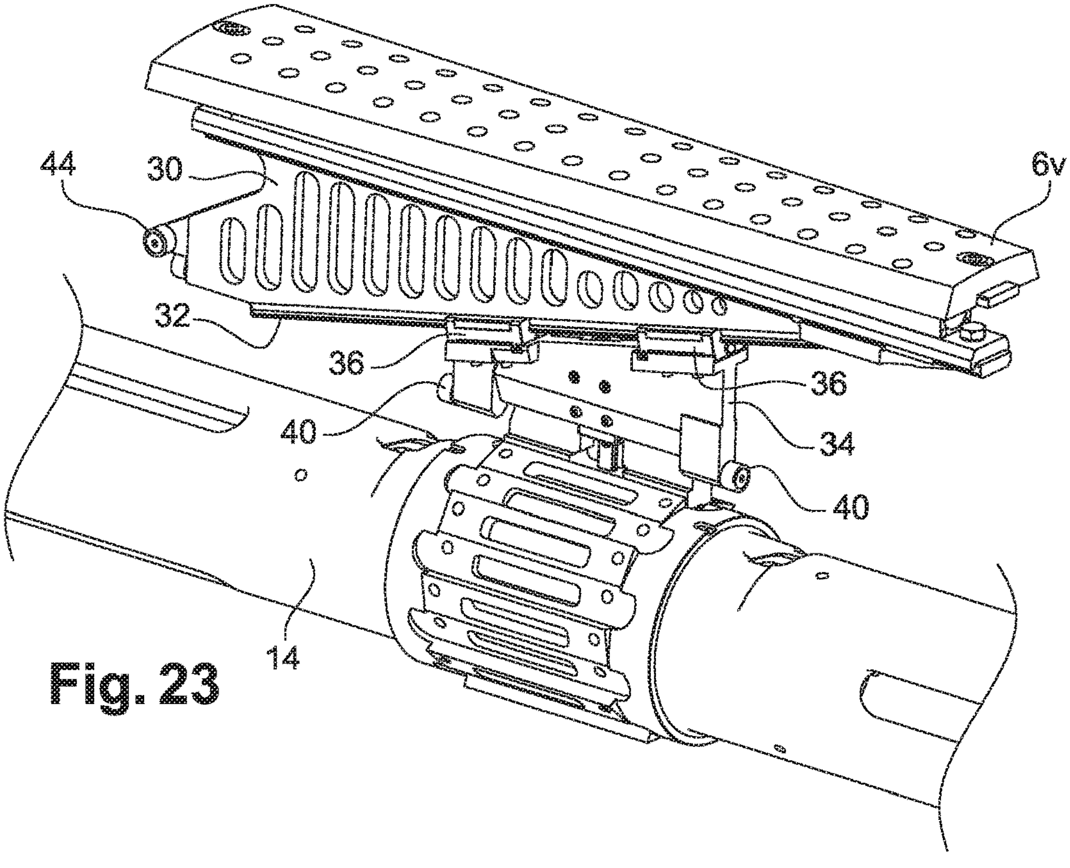

As illustrated, in particular, in FIG. 20, the key sectors have, under each of their lateral faces 9, a cut-out or step 82 that enables them to receive a portion of the vault sectors after the start of the radial movement of the latter. Continuation of the movement of the two types of sector may thus be effected with the vault sectors partially housed in the cut-outs. This cut-out makes it possible to avoid moving the vault sectors over too long a radial travel in the first phase and thus allows the cycle times to be reduced.

In the position of FIG. 7, it is easy to remove the tread from the drum using adapted tooling. Once this removal has been completed, the mechanism is actuated in the reverse direction in order to place the sectors back in their original position.

The two mechanisms, which, respectively, allow adjustment of the diameter and collapsing, are totally independent. Advantageously, thus, it is possible, at the time of a change in dimension involving adjustment to a new diameter, to commence by collapsing the form, so that the sectors are no longer in contact with one another, in order to be able to move them freely and to not prematurely cause wear to the faces 9.

As was seen previously, the drum 2 comprises eighteen sectors (6*c*, 6*v*). This number of sectors was chosen to obtain minimum "discontinuity" of the outer surface of the drum in order to achieve optimum geometric regularity (cylindricity and continuity of the surface) over the entire diameter adjustment range, this range extending, in the present case, over 100 mm. Thus, the greater the number of sectors, the smaller the influence of the irregularities in the circumferential surface of the drum on the uniformity of the tire casing manufactured thereon. The embodiment described is the result of a compromise between the largest possible number of sectors, the complexity involved in housing the mechanisms allowing the different movements of the sectors to be controlled, and thus the price. To that end, the number of eighteen sectors may be considered as too large for it to be possible to accommodate eighteen ramps on one and the same face of a control cam, at least on a cam of which the diameter is limited by the other elements of the drum. This is why the drum 2 comprises two double-face monoblock cams 60 with eighteen ramps 62, 64, nine ramps on each face. The use of double-face cams makes it possible to limit the size and the number of elements necessary for controlling this drum 2 with a working diameter equal to 500 mm.

Naturally, numerous modifications may be made to the invention without departing from the scope thereof.

Mechanisms that allow, during one and the same movement of a cam, the descent of the vault sectors first and then the simultaneous descent of the key sectors and of the vault sectors are applicable to other types of drum and, for example, to that of the aforesaid patent application WO 2013/054051.

The invention claimed is:

1. A drum for producing a tire casing blank, which comprises a support and sectors forming a circumferential face of the drum, each sector having a circumferential outer face having a contour of generally trapezoidal form, said drum comprising a first mechanism able to move each sector relative to the support in a first respective non-radial predetermined direction relative to an axis of rotation of the drum and intercepting this axis, and said drum comprising a second mechanism able to move each sector relative to the support in a second respective radial direction relative to the axis of rotation of the drum, and wherein the second mechanism can be activated independently of the first mechanism.

2. The drum according to claim 1, wherein each sector is mounted so as to be movable in translation by rectilinear sliding, relative to the support in the respective non-radial predetermined direction.

3. The drum according to claim 1, wherein the first mechanism comprises ramps extending in the first respective non-radial predetermined directions and are able to guide the sectors in the first respective non-radial predetermined direction.

4. The drum according to claim 3, wherein each sector is connected to the support by a respective angle plate carrying the respective ramp.

5. The drum according to claim 1, arranged such that all of the sectors cannot be moved relative to the support in the respective non-radial predetermined directions without some of the sectors, also, moving relative to the support in the respective non-radial predetermined directions specific to them.

6. The drum according to claim 1, wherein the sectors form two subassemblies with half of the sectors being present in each of the two subassemblies, the sub-assemblies being arranged such that, when each of the sectors of one of the subassemblies moves in the respective non-radial predetermined direction relative to the support, each sector moves along the axis in a first direction and the sectors of the other subassembly move along the axis in a second direction, which is opposite to the first direction.

7. The drum according to claim 6, arranged such that the two subassemblies are the axially symmetric image of one another but with a circumferential offset.

8. The drum according to claim 1, which comprises at least one set of equipment mounted so as to slide relative to the support in the direction of the axis of rotation and connected to a plurality of the sectors.

9. The drum according to claim 1, wherein when the sectors extend to the same distance from the axis of rotation, irrespective of what that distance might be, the circumferential outer faces of the sectors have edges each having a chord merged with the corresponding chord of the adjacent sector.

10. The drum according to claim 1, wherein each sector has two principal planar lateral faces arranged in order to be placed opposite homologous faces of adjacent ones of the sectors.

11. The drum according to claim 1, wherein certain ones of the sectors are capable of being placed so as to bear against other ones of the sectors in the radial direction relative to the axis of rotation of the drum.

12. The drum according to claim 1, wherein the support comprises a shaft and wherein the second mechanism comprises plates that are rigidly fixed to the shaft and extend in the radial directions to guide the sectors in the second respective radial predetermined directions.

13. A method for producing a tire casing, wherein a portion at least of a tread of a green blank of the casing is assembled on a drum in accordance with claim 1.

14. A drum for producing a tire casing blank, which comprises a support and sectors forming a circumferential face of the drum, each sector having a circumferential outer face having a contour of generally trapezoidal form and being mounted so as to be movable relative to the support in a respective non-radial predetermined direction relative to an axis of rotation of the drum and intercepting this axis, wherein each sector has two principle planar lateral faces arranged in order to be placed opposite the homologous faces of adjacent ones of the sectors, wherein a plane of each lateral face is an image of a radial plane relative to the axis of rotation through a first rotation about a first axis (a1) perpendicular thereto, and through a second rotation about a second axis (a2) perpendicular to the first axis, the two rotations each taking place over an angle of greater than 0° and less than 90°.

15. The drum according to claim 14, wherein the angle of the second rotation is between 2 and 5°.

16. A drum for producing a tire casing blank, which comprises a support and sectors forming a circumferential face of the drum, each sector having a circumferential outer face having a contour of generally trapezoidal form and being mounted so as to be movable relative to the support in a respective non-radial predetermined direction relative to an axis of rotation of the drum and intercepting this axis, which comprises at least one cam for controlling a radial movement of the sectors relative to the axis of rotation of the drum, a cam of the at least one cam being arranged such that a monotonous movement of the cam gives rise, first, to the radial movement of some the sectors without modifying a radial position of other ones of the sectors, and then gives rise to the radial movement of all the sectors simultaneously.

* * * * *